July 23, 1957 W. F. MLYNAREK 2,800,199
LUBRICATOR FOR ARTICULATED CONVEYOR BELTS
Filed Nov. 16, 1954 2 Sheets-Sheet 1
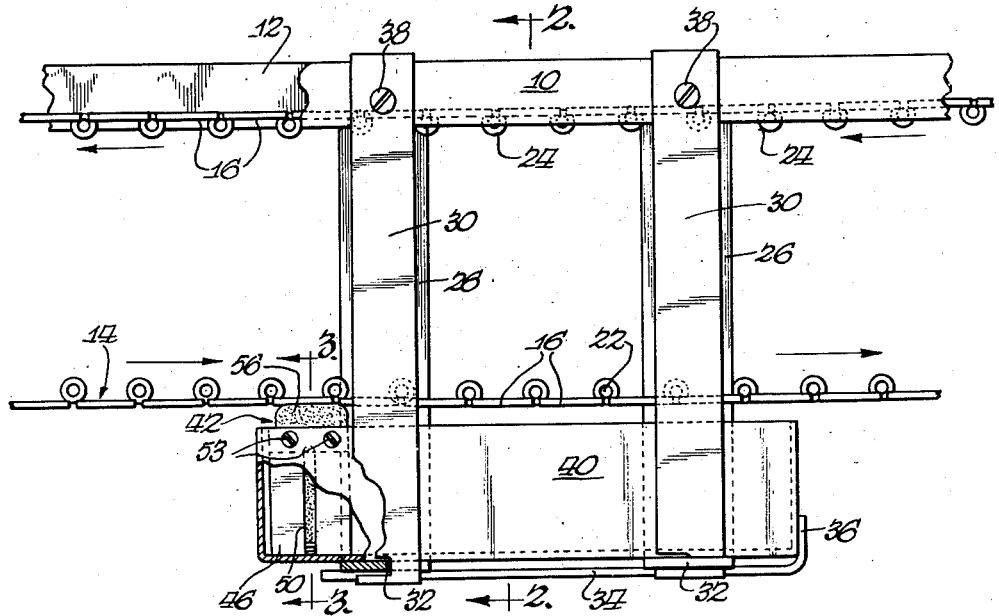
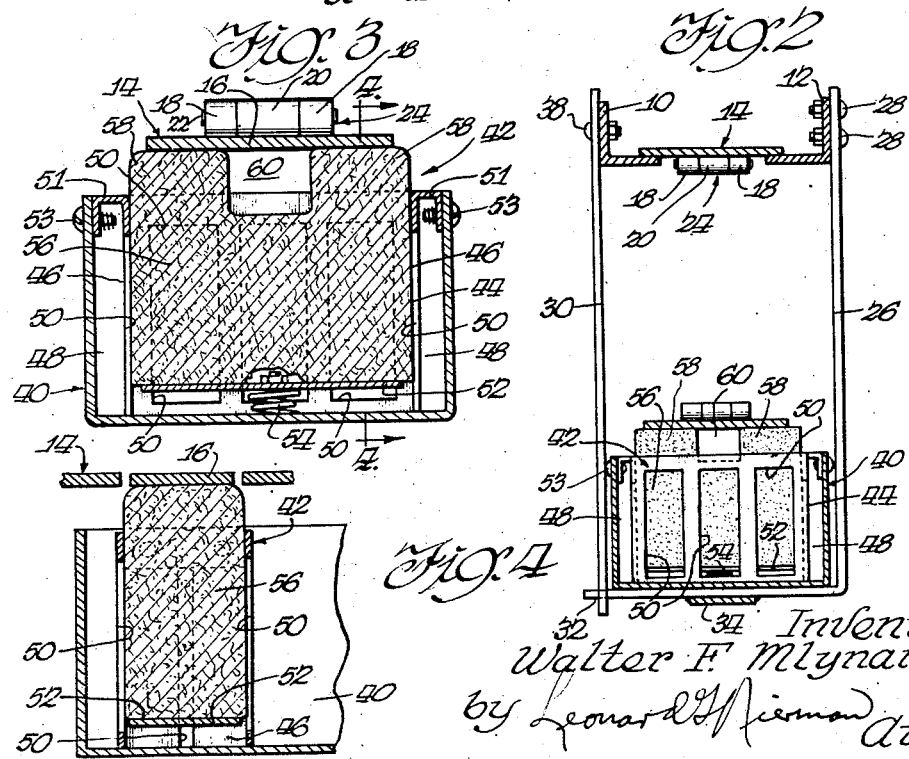
Inventor
Walter F. Mlynarek July 23, 1957 W. F. MLYNAREK 2,800,199
LUBRICATOR FOR ARTICULATED CONVEYOR BELTS
Filed Nov. 16, 1954 2 Sheets-Sheet 2
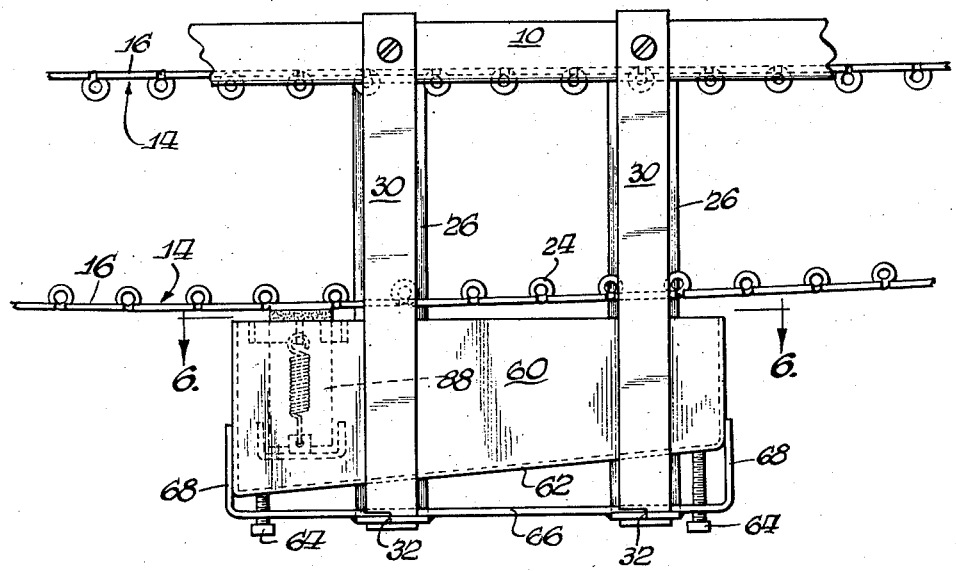
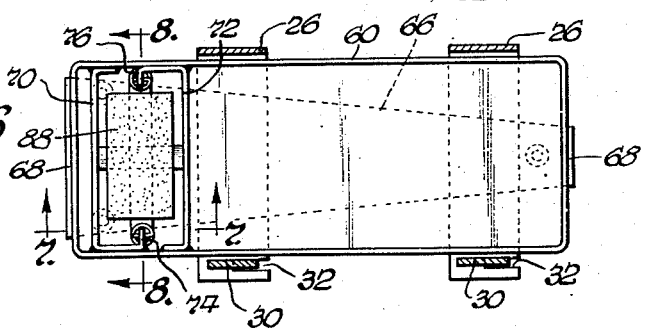
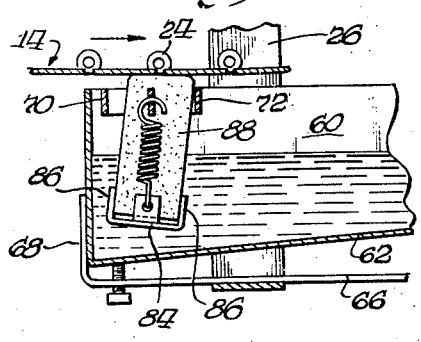
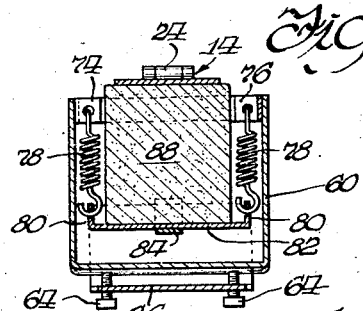
Inventor
Walter F. Mlynarek
by Leonard S. Nieman
Atty.

United States Patent Office 2,800,199
Patented July 23, 1957

2,800,199
LUBRICATOR FOR ARTICULATED CONVEYOR BELTS

Walter F. Mlynarek, Milwaukee, Wis.

Application November 16, 1954, Serial No. 469,093

5 Claims. (Cl. 184—16)

This invention relates to a lubricator for conveyor belts, and more specifically to a lubricator for metal chain belts of the type commonly used in the bottling industry.

One type of conveyor mechanism in common use employs an endless belt which consists of an articulated train of metal plates, normally rectangular in shape, each member in the chain being connected to the adjacent member by a joint resembling an ordinary door hinge. Such belts are commonly used for horizontal conveying of bottles and similar work-pieces where conventional endless belts, such as those of rubber or fabric, are prohibited by considerations of sanitation or chemical action. As with any type of conveyor belt system, the belt has a working portion of its path, wherein the bottles or other work-pieces are disposed on the upwardly facing outer surface of the belt, and a return portion of its path wherein the belt is returned to the commencement of the working path; normally all conveying operations are performed in the working portion of the path, since the outer surface of the belt faces downwardly in the return portion of the path. In one common type of such conveyor belts, the hinges which connect adjoining plates which constitute the links of the chain belt are disposed centrally of the belt and on the inner surface thereof, and the belt is supported in the working portion of its path by a track upon which the inner surface of the belt is slidingly supported only at the sides thereof, so that the outer surface of the belt presents an essentially continuous flat surface, while the surface discontinuities on the inner surface produced by the hinge structure do not interfere with the smooth sliding support of the belt.

When such a type of conveyor belt is employed, it is necessary to continuously lubricate the belt, in order to permit it to slide freely over the stationary track so provided for it, and also to lubricate the hinges, which are flexed as the belt travels over the drums conventionally provided at each end of its path.

Various devices have heretofore been employed to lubricate chain belts of the type described above. In one type of lubricating system in fairly common use, the lubricant is sprayed on the inner surface of the belt, and in another type of lubricating device the belt is immersed at some point in its return path in the lubricant liquid. The essence of the present invention lies in the discovery that the prior art types of lubrication of such belts result in an unnecessary waste of lubricant, and in the provision of a lubricator structure wherein the waste of lubricant is greatly diminished, so that the consumption of lubricant in the operation of such a conveyor belt system is considerably reduced. The present lubricator achieves this objective by the application of the lubricant to restricted portions of the belt in such a manner that the lubricant distributes itself in accordance with the relative needs of the various portions of the belt and thus provides adequate lubricant to the friction surfaces whereon the greatest part of the lubricant is actually required, and lesser amounts of lubricant to the portion of the belt whose requirements are not as great. This result is achieved by a structure which is both simple and inexpensive to manufacture, and in addition requires a minimum of refilling and maintenance. The structure is additionally adapted for simple installation on any type of conveyor belt system for use with which it is designed, and further provides not only ease in replenishing the supply of lubricant in the lubricator, but also simplicity of cleaning of the reservoir from which the lubricant is fed.

For understanding of the structure by which these advantages are obtained, reference is made to the description which appears below of two embodiments of the invention, these embodiments being illustrated in the appended drawing, in which:

Fig. 1 is a side view in elevation (partially broken away in section) of a lubricator made in accordance with the invention mounted upon a fragmentarily illustrated conveyor assembly;

Fig. 2 is a vertical sectional view taken along the line 2—2 of Fig. 1 in the direction indicated by arrows;

Fig. 3 is a fragmentary vertical sectional view taken along the line 3—3 of Fig. 1 in the direction indicated by arrows:

Fig. 4 is a fragmentary vertical sectional view taken along the line 4—4 of Fig. 3 in the direction indicated by arrows;

Fig. 5 is a side view in elevation of another form of lubricator;

Fig. 6 is a horizontal sectional view taken along the line 6—6 of Fig. 5;

Fig. 7 is a vertical sectional view taken along the line 7—7 of Fig. 6, but illustrating a slightly different position of the parts; and Fig. 8 is a vertical sectional view taken along the line 8—8 of Fig. 6.

As shown in Figs. 1 to 4 of the drawing, the conveyor system includes two oppositely disposed elongated angle members 10 and 12 forming an upwardly facing channel through which the belt, generally designated 14, passes. The belt 14 consists of rectangular plates or links 16, each link 16 having a pair of hinge eyes 18 at one end and a meshing hinge eye 20 at the other end, the links being joined end to end by pins 22 extending through the respective meshed eyes 18 and 20 to form a unitary conveyor chain belt. The hinges 24 formed by the eyes 18 and 20 and the pins 22 are disposed on the inner surface of the belt 14, which is of any suitable material such as stainless steel. The belt is driven in conventional fashion by drums (not illustrated) at the ends of its path, and in the working portion of the path the sides of the inner surface of the belt are slidingly supported on the angle members 10 and 12, which thus constitute a track which is centrally open to permit free passage of the hinges 24. It will of course be understood that the structure thus far described constitutes no part of the invention, being well known in the art, and the drive mechanism and supporting structure therefor being omitted from the drawing for the purpose of avoiding confusion in understanding the essence of the present invention.

Depending from the angle member 12 are spaced L-shaped brackets or straps 26, the upper ends being secured to the angle member 12 by bolts 28, and the transverse portions extending crosswise below the belt 14. Depending from the angle member 10 opposite the brackets or straps 26 are flat brackets or straps 30. The brackets 26 and 30 have interlocking notches at 32 to form a U-shaped support for the structure hereinafter to be described. Secured as by welding to the under surface of the transverse portions of brackets 26 is a longitudinal strap 34 having an upward bend or lip 36 at one end thereof. As indicated by arrows in the drawing, the direction of motion of the belt 14 is counterclockwise in the illustration of Fig. 1, and lip 36 is designed to secure in place, against the frictional force exerted by the belt 14, the tank and applicator assembly which is cradled between the brackets 26 and 30 beneath the under surface of the return path portion of the belt 14. Each strap 30 is secured to the angle member 10 by a single bolt 38. Upon loosening of the bolts 38, the straps 30 may be pivoted therearound, disengaging the interlocking notches 32 in the process, and the tank and applicator assembly may thus be readily removed and installed from the side of the structure.

Supported beneath the under surface of the return portion of the belt 14 in the manner described above is a long rectangular tank 40. The open-top tank 40 is disposed with its long dimension beneath, and substantially parallel to, the belt 14.

Adjacent to, but slightly spaced from, the end of the tank 40 over which each link of the belt 14 first passes is an applicator assembly generally designated by the numeral 42. The applicator assembly 42 includes a generally rectangular tubular guide 44 of a width less than the width of the tank 40 and having its side walls 46 spaced from the side walls of the tank 40 to form fluid flow passages 48 connecting the small region of the tank 40 adjacent to the end wall of the tank with the main body of the tank 40. The guide 44 has perforations or openings 50 in all four sides thereof to permit free flow of fluid from the tank into the guide, and is positioned in the tank by integrally formed ears 51 and screws 53. A flat support member 52 of a rectangular shape substantially corresponding to the interior shape of the guide 44 is seated near the bottom of the guide and is reciprocable vertically therein. A compression spring 54 is affixed to the central portion of the under surface of the support member 52 and urges the support member upwardly in the guide. Seated on the support member 52 is a porous elastic applicator 56, preferably a cellulose sponge, of a cross-sectional shape corresponding to the shape of the guide 44, and of a size to reciprocate freely in the guide 44.

The upper end of the applicator 56 has upwardly protruding flat-ended extensions 58 at the sides thereof, formed by cutting away a channel 60 in the upper surface of the rectangular block from which the applicator is fabricated.

The applicator 56 is urged against the under surface of the belt 14 by the action of the compression spring 54. The spring 54 has a restoring force such as to easily lift the applicator and urge it against the belt, but not sufficient to unduly compress the applicator or to substantially alter the path of the chain 14. The tank 40 is filled to an appropriate level with the lubricant employed, which is preferably of an oil-free water-soluble detergent type.

It will be seen that with the structure described above, the lubricant is continuously deposited on the side portions of the outer surface of the belt. Any excess lubricant deposited on the belt in this manner drips back into the main body of the tank 40 as the belt passes thereover. Thus when each link ends its return path and proceeds onto the drum or other drive or guide means (not illustrated) at the end of the return path, the lubricant is primarily on the outer (under) surface of the links 16, at the sides thereof. When the link has proceeded over the drum and commences its progress through the working path of the belt, the outer surface, which was previously the under surface, now faces upward, and the lubricant so previously deposited predominantly on the outer surface flows, by the action of gravity, around the edges of the link, and is predominantly deposited in the interface between the side portions of the inner surface of the belt and the angle members 10 and 12 upon which the belt slides. At the same time, a small amount of lubricant flows into the hinges 24. Since the frictional wear on the hinges 24 is far less than on the interface between the link 16 and the angle members 10 and 12, it will be seen that the arrangement described provides a maximum of lubricant at the location where lubrication is most required, and a lesser amount where less lubricant is required.

The application of the lubricant directly to only the outer surface of the belt, and the flow thereof to the friction surface by gravity in the working portion of the cycle, minimize the waste of lubricant which is entailed where the lubricant is applied directly to the friction surface. This saving of lubricant arises to a large extent from the fact that lubricant which is on the inner surface of the belt as the belt enters onto the angle support members at the commencement of the working path is largely wiped off at this point, a loss which is minimized with the present system of lubrication. Furthermore, the present system avoids the loss of lubricant from the inner surface of the belt which occurs due to squeezing out of lubricant at the end of the return path in devices in which the bulk of the lubricant is deposited on the inner, rather than the outer, face of the belt. Also, it will be noted that, with the present system, the lubricant is continuously fed from the upper surface of the belt to the interface between the under surface of the belt and the support members as the belt progresses across its entire working path.

It will of course be understood that the above phenomena are not readily obvious on visual inspection when a conveyor apparatus to which the present lubricant system is applied is in operation, since the continued operation of the system quickly results in the overall coating of the belt and the support members with a film of the lubricant, some of which is ultimately lost in drippage. Nevertheless, it is found that the drippage and waste produced with the present system are much less than those produced with lubrication systems heretofore employed, and the saving is attributable to the factors discussed above.

It will be noted that with the system illustrated, it is unnecessary to provide an auxiliary drippage or waste tank at the point of application of the lubricant to the belt, since the assembly described serves at the same time as a waste tank and as a feed tank. For the same reason, the waste which is caught by the tank automatically is restored as a part of the feed lubricant, thus rendering unnecessary the relatively frequent emptying of the waste tank into the feed reservoir which was generally required in the systems heretofore employed in order to reduce lubricant consumption.

The device of Figures 5 through 8 is similar in many respects to the embodiment described above, but incorporates additional advantageous features of construction. The tank 60 is in this case tapered in depth, the bottom 62 sloping downwardly from the shallow end to the deep end at which the applicator assembly is mounted. The sloping orientation of the bottom 62 is maintained by adjustable bolts 64 threaded through the longitudinal strap 66 which is in this case formed with lips 68 at both ends. Identical brackets 70 and 72 are mounted in spaced relation adjacent to the top edge of the tank and are formed with inwardly extending ears 74 and 76 at opposite sides of the tank. Depending from apertures in the ears 74 and 76 are coiled extension springs 78 which are hooked at their lower ends to upwardly extending ears 80 on a transversely extending bar or strap 82. A second bar or strap 84 with upwardly bent ends 86 is welded crosswise of the bar 84, thus forming a spring-suspended cradle support into which the lower end of the rectangular-shaped applicator member 88 is fitted. The applicator member 88 may be of simple rectangular form, as illustrated, or may be extended at the sides as in the previous embodiment.

As shown in Figure 7, when the chain 14 moves in the direction indicated by the arrow, the applicator 88 is tilted forward, but is held in substantially vertical position by abutment against the strap or bracket 72. The slope of the bottom 62 substantially increases the efficiency of the lubricator by decreasing the fraction of the volume of the original amount of lubricant within the tank which remains when the level of the lubricant becomes too low to continue to feed the lubricant to the porous applicator 88. Thus the necessary frequency of refilling of the tank 60 for any given volume thereof is reduced.

It will be observed that both of the illustrated embodiments of the invention avoid the redeposition on the chain of foreign materials which are carried off the chain into the tank as excess lubricant drips back into the tank from portions of the chain which have just passed over the applicator. Solid materials are deposited on the bottom of the tank, and are not conveyed back to the chain by the porous applicator. Further, by reason of the fact that there is no turbulence of the lubricant in the tank, the lubricant remains relatively clean despite the deposition of substantial amounts of contaminating solids.

What is claimed is:

1. A lubricator for an endless articulated conveyor belt comprising an elongated open-top tank tapered in depth from one end to the other end and adapted to contain a lubricant, a support member in the deep end of the tank, spring means acting between the support member and the tank to urge the support member toward the top of the tank, an applicator consisting of a single block of porous elastic material having only the lower end thereof resting on the support member and having its vertical surfaces substantially exposed to the interior of the tank, and stationary guide means in the tank loosely engaging the applicator to restrain the applicator against motion lengthwise of the tank.

2. A lubricator for an endless articulated conveyor belt comprising an elongated open-top tank adapted to contain a lubricant, a support member in one end of the tank, spring means acting between the support member and the tank to urge the support member toward the top of the tank, an applicator consisting of a single block of porous elastic material having only the lower end thereof resting on the support member and having its vertical surfaces substantially exposed to the interior of the tank, and stationary guide means in the tank loosely engaging the applicator to restrain the applicator against motion lengthwise of the tank.

3. A lubricator for an endless articulated conveyor belt comprising an elongated open-top tank adapted to contain a lubricant, a support member in one end of the tank, spring means acting between the support member and the tank to urge the support member toward the top of the tank, an applicator consisting of a single block of cellulose sponge having the lower end thereof resting on the support member and having its vertical surfaces substantially exposed to the interior of the tank, and stationary guide means in the tank loosely engaging the applicator to restrain the applicator against motion lengthwise of the tank.

4. A lubricator for an endless articulated conveyor belt comprising an elongated open-top tank adapted to contain a lubricant, a cradle at one end of the tank, spring means acting between the cradle and the tank to urge the cradle toward the top of the tank, an applicator consisting of a single block of porous elastic material having the lower end thereof in the cradle and having its vertical surfaces substantially exposed to the interior of the tank, and stationary guide means in the tank loosely engaging the applicator to restrain the applicator against motion lengthwise of the tank.

5. A lubricator for an endless articulated conveyor belt comprising an elongated open-top tank tapered in depth from one end to the other end and adapted to contain a lubricant, a support member in the deep end of the tank, vertically extending coiled springs having their upper ends connected to the tank and their lower ends connected to the sides of the cradle to urge the cradle toward the top of the tank, an applicator consisting of a single block of cellulose sponge having the lower end thereof in the cradle and having its vertical surfaces substantially exposed to the interior of the tank, and a strap extending crosswise of the tank and loosely engaging the applicator to restrain the applicator against motion lengthwise of the tank.

References Cited in the file of this patent

UNITED STATES PATENTS

| | | |
|---|---|---|
| 602,959 | Rogers | Apr. 26, 1898 |
| 826,321 | Eustis | July 17, 1906 |
| 1,286,280 | Gensley | Dec. 3, 1918 |
| 1,665,451 | Gates | Apr. 10, 1928 |
| 1,967,751 | Goerlich | July 24, 1934 |
| 2,066,761 | Brown | Jan. 5, 1937 |
| 2,548,739 | Peck | Apr. 10, 1951 |
| 2,670,069 | Dobkin | Feb. 23, 1954 |